US006612386B2

(12) United States Patent
Tamai et al.

(10) Patent No.: US 6,612,386 B2
(45) Date of Patent: Sep. 2, 2003

(54) APPARATUS AND METHOD FOR CONTROLLING A HYBRID VEHICLE (75) Inventors: Goro Tamai, Warren, MI (US); William Leonard Aldrich, III, Davisburg, MI (US); Tony T. Hoang, Warren, MI (US); Patrick L. Risse, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 69 days.

(21) Appl. No.: 09/870,337

(22) Filed: May 30, 2001

(65) Prior Publication Data
US 2002/0179347 A1 Dec. 5, 2002

(51) Int. Cl.[7] .............................. B60K 1/00; H02P 5/00; H02P 9/06; A47L 13/12
(52) U.S. Cl. ..................... 180/65.4; 180/65.2; 318/139; 322/13; 701/22
(58) Field of Search ................. 180/65.2, 65.3, 180/65.4, 65.8; 290/40 A, 40 C; 318/139; 322/11, 12, 13; 701/22, 99

(56) References Cited

U.S. PATENT DOCUMENTS

| 4,269,280 A | | 5/1981 | Rosen .......................... 180/54 |
| 4,335,429 A | * | 6/1982 | Kawakatsu ................... 364/424 |
| 4,351,405 A | | 9/1982 | Fields et al. .............. 180/65 A |
| 4,438,342 A | | 3/1984 | Kenyon ........................ 290/45 |
| 5,249,637 A | | 10/1993 | Heidl et al. ................. 180/65.2 |
| 5,566,774 A | * | 10/1996 | Yoshida ....................... 180/65.4 |
| 5,568,023 A | | 10/1996 | Grayer et al. ................ 318/139 |
| 5,614,809 A | * | 3/1997 | Kiuchi et al. .................. 322/11 |
| 5,713,425 A | | 2/1998 | Buschhaus et al. ......... 180/65.2 |
| 5,789,881 A | | 8/1998 | Egami et al. ................ 318/139 |
| 5,890,468 A | | 4/1999 | Ozawa ........................ 123/561 |
| 6,003,626 A | * | 12/1999 | Ibaraki et al. .............. 180/65.2 |
| 6,020,697 A | | 2/2000 | Shimasaki et al. ........... 318/140 |
| 6,166,517 A | * | 12/2000 | Wakashiro et al. .......... 320/104 |
| 6,253,127 B1 | * | 6/2001 | Itoyama et al. ................ 701/22 |
| 6,408,969 B1 | * | 6/2002 | Lobert et al. ............... 180/65.3 |
| 6,459,166 B2 | * | 10/2002 | Yanase et al. ............. 290/40 C |
| 6,469,402 B2 | * | 10/2002 | Morimoto et al. ......... 290/40 C |

FOREIGN PATENT DOCUMENTS

| DE | 4142863 C2 | 4/1993 |
| EP | 0925981 A2 | 6/1999 |

* cited by examiner

Primary Examiner—Brian L. Johnson
Assistant Examiner—G B Klebe
(74) Attorney, Agent, or Firm—Christopher DeVries (57) ABSTRACT A propulsion system for use in a hybrid vehicle, the propulsion system includes an internal combustion engine, an electric motor/generator operatively coupled to the internal combustion engine, an electric storage medium, and a propulsion system controller for actuating the propulsion system. The propulsion system controller varies the operating conditions of the electric motor/generator system in response to operating conditions of the vehicle. The propulsion system controller further varies the operating conditions of the electric motor/generator during an engine cranking sequence.

16 Claims, 5 Drawing Sheets

APPARATUS AND METHOD FOR CONTROLLING A HYBRID VEHICLE

This patent application is related to U.S. patent application Ser. No. 09/483,986, now U.S. Pat. No. 6,376,927, Ser. No. 09/483,987, now U.S. Pat. No. 6,254,507, Ser. No. 09/551,460, now U.S. Pat. No. 6,307,277, and Ser. No. 09/659,395, now U.S. Pat. No. 6,275,004, the contents of which are incorporated herein by reference thereto.

TECHNICAL FIELD

The present invention is related to a method and apparatus for controlling a hybrid vehicle.

BACKGROUND

A Hybrid Vehicle is a vehicle that has two sources of propulsion. A hybrid electric vehicle (HEV) is a vehicle wherein one of the sources of propulsion is electric and the other source of propulsion may be derived from fuel cells or an internal combustion engine (ICE) that burns diesel, gasoline or any other source of fuel. The hybrid vehicle employs an operating system for controlling the alternative sources of propulsion.

An electric motor-generator (MoGen) system replaces the separate starter motor and alternator.

The motor generator or "MoGen" of a hybrid system provides many unique aspects of powertrain control previously unavailable with a conventional or separate engine starter and alternator control scheme. A separate conventional starter control only allows the starter motor to apply torque to the internal combustion engine during a crank event. A separate alternator control simply charges to a set point voltage.

SUMMARY OF THE INVENTION

A propulsion system for use in a hybrid vehicle, the propulsion system includes an internal combustion engine, an electric motor/generator operatively coupled to the internal combustion engine and an electric storage medium and a propulsion system controller for actuating the propulsion system. The propulsion system controller varies the operating conditions of the electric motor/generator system in response to operating conditions of the vehicle.

BRIEF DESCRIPTION OF THE DRAWINGS

The present invention will now be described, by way of example only, with reference to the accompanying drawings in which.

DESCRIPTION OF PREFERRED EMBODIMENT

A hybrid vehicle employing a motor generator or "MoGen" in a hybrid system allows many new and unique forms of powertrain control. Accordingly, it is advantageous to determine the status of numerous components of a hybrid system in order to most efficiently utilize all facets of the powertrain control.

For example, and when a hybrid vehicle is decelerating or is stopped, and a control system in accordance with an exemplary embodiment of the present invention is employed, the fuel flow to the engine is shut off to improve fuel economy. Therefore, it is desirable to have the status of the hybrid vehicle components inputted into the control system.

A MoGen system is implemented to enable this fuel-cutoff feature without sacrificing driveability. From a stop, upon brake-pedal release, the MoGen system creeps the vehicle forward while turning the gas engine to start it. Once the engine is running, the MoGen acts as a generator to supply the vehicle's electrical power requirements as well as recharging an electrical storage medium or battery pack. When the engine is off, the vehicle's electrical loads (fans, radio. etc.) are supported by a battery system and a DCDC converter, the MoGen also acts as a motor during fuel-off deceleration downshift to synchronize the engine and transmission speeds.

The control system according to an exemplary embodiment of the present invention may be used in the environment described with reference to FIG. 1. The control system controls the fuel efficiency of a hybrid vehicle drive system 10. Hybrid vehicle drive system includes a gas engine 12, a torque converter 14 and a multi-speed automatic transmission 16.

The hybrid drive system 10 further includes a motor generator 18 operatively connected to the front end of the engine by a direct belt or chain drive 20 for providing a drive path to a crankshaft 22 of engine 12. Motor generator 18 is operatively associated with a controller 24 for selectively operating motor-generator 18 during start or to produce generated power for charging an array of batteries 26.

An engine and transmission controller 28 is associated with a brake pressure sensor 30 that directs a signal to controller 28. A suitable DCDC converter 32 is provided to direct higher voltage charging power from the motor generator 18 to a low voltage accessory system, during generator operation.

The system includes an over-speed locking and forward speed freewheeling one-way clutch assembly as described in U.S. patent application Ser. No. 09/483,987, filed Jan. 8, 2000, the contents of which are incorporated herein by reference thereto, operatively connected between the impeller or pump of the torque converter 14 and the turbine thereof.

The transmission 16 includes known gear sets, clutches, brakes operative to provide a number of drive speed ratios between the engine 12 and a vehicle drive system 34 such as the illustrated differential 36 and drive wheels 38 and 40 with it being understood that the drive wheels can be front or rear drive wheels and that the drive system can be modified to include various forms of power transfer to and from either front or rear drive wheels or both as desired. Multi-speed transmissions 16 are well known and as such a complete description thereof is not required for purposes of understanding the configuration and operation of the present invention.

In addition, and as an alternative embodiment the motor generator can be mounted directly to the crankshaft between the engine and the transmission.

For a full understanding of the operation of the modified torque converter reference is made to U.S. Pat. Nos. 09/483, 987.

When combined with an electric motor generator 18 having its rotor connected mechanically to the crankshaft of a vehicle such an arrangement can take advantage of back drive from the vehicle wheels to the engine, as occurs during vehicle coasting operations, to drive the rotor of the generator 18 during a regenerative phase of operation where the controller 24 conditions the motor generator 18 to direct charging current from the motor generator 18 to charge the batteries 24. During such coasting, in addition to using the vehicle momentum to recharge the batteries, it is desirable to cut-off fuel flow to the gas engine by use of an aggressive fuel control algorithm. Such operation, however, when using known torque converter designs is not optimal in that the fluid coupling action of the torque converter and/or slip in the lock-up clutch can cause the engine speed to drop below the transmission coasting speed and when fuel is cut-off, the engine can stall. In such cases the battery charge produced during coasting and the battery charge required for the electric starter motor can result in a net energy loss. Hence, the advantage of a motor generator arrangement is not fully realized.

Figure 1:
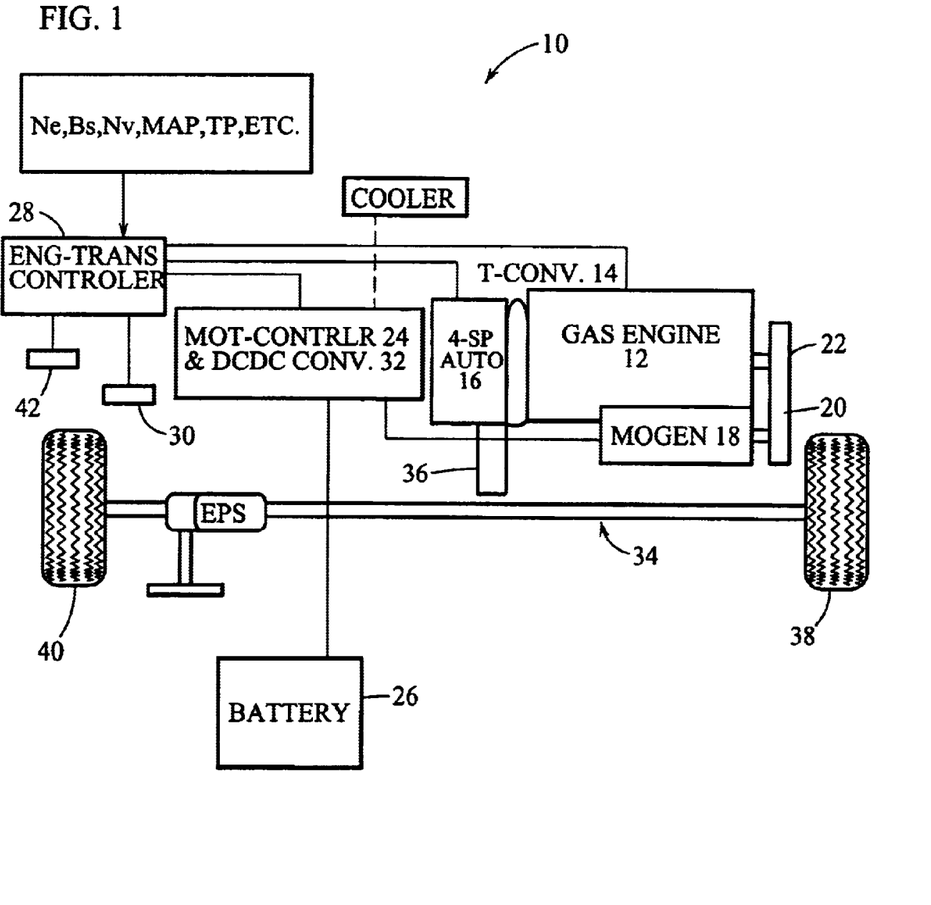
FIG. 1 is a diagrammatic view of a hybrid vehicle drive system including the present invention.

The power train controller has an engine controller that includes a dash board or control panel indicator such as a light or a chime indicative of the hybrid system being active as shown by reference numeral 42 in FIG. 1. The power train controller includes an engine and transmission control microprocessor 28 that is inputted with engine output speed Ne, transmission states, vehicle speed Nv, intake manifold air pressure MAP, brake sensor signal, and throttle position TP and is programmed in response to such signals to deliver fuel and engine spark to control engine acceleration and speed.

In accordance with an embodiment of the present invention a control system determines the Degree of Hybridization of the vehicle. "Degree of Hybridization" relates to the level or degree to which the MoGen hybrid system interacts with or replaces, the normal functions of an internal combustion engine.

In addition, and since the MoGen system is in constant mesh with the internal combustion engine, the MoGen system can be used to optimize control for all internal combustion engine operational modes. Additionally, the enhanced control of charging capabilities allows a much more efficient control methodology. Therefore, in accordance with the increased control capabilities, a control system must exist to take advantage of the increased opportunities offered by the MoGen hybrid hardware.

Figure 2:
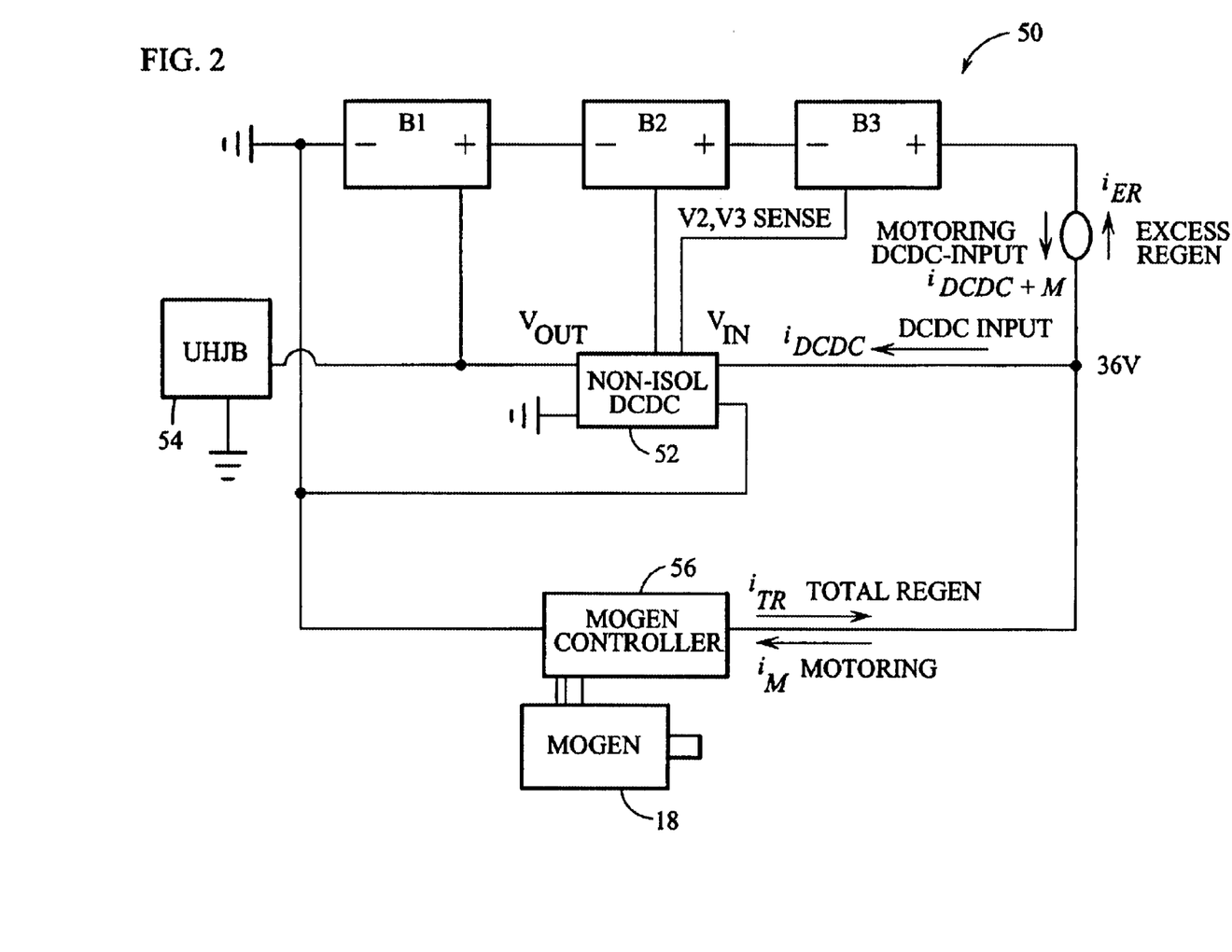
FIG. 2 is an electrical schematic of a hybrid vehicle powertrain.

Referring now to FIG. 2, an electrical schematic of a MoGen hybrid powertrain 50 is illustrated.

This hybrid powertrain system uses "Excess Regen" determined through a single current-measuring device (e.g. shunt), as the main variable to manage the battery SOU (state-of-usage) and SOC (state-of-charge). The electrical power control system and the mechanical architecture dynamically change among four different modes of battery SOU to maintain battery SOC, enhance battery longevity, maintain vehicle driveability, and improve engine responsiveness. The modes are identified as follows: Excess Regen; Zero Excess Regen; MoGen Neutral; and Motoring Discharge.

For purposes of explanation and referring to FIG. 2, we will assume the system operates at a nominal 36 Volts. Of course, it is contemplated in accordance with the present invention that the system can operate at voltages greater or less than 36 Volts.

A first battery, battery B1 is chassis grounded, and an additional two batteries B2 and B3 are all connected in series as shown in FIG. 2. The respective voltages across each battery (B1, B2 and B3) is identified as V1, V2, and V3. As an alternative a single 36V battery module with three posts (Ground, 12V, 36V) can also be used, as well as a 36V module and a separate 12V module.

A "DCDC converter" 52 converts the 36V bus down to the conventional 12V to power, in parallel with B1 and an Under Hood Junction Box 54 (UHJB).

An alternative system utilizes more or fewer battery modules depending on the module voltage (e.g. 2V, 6V, 8V, 12V. etc.) and can also be configured with an isolated as well as a non-isolated DCDC converter.

The use of an isolated DCDC converter enables the current sensor(s) to be placed on the low-side (chassis grounded) which is a simpler arrangement, but the power electronics inside the DCDC converter become more complicated and expensive. In conjunction with the Excess Regen System, the SOC balance between the chassis-grounded module and the others is controlled by the system described in U.S. patent application Ser. No. 09/659,395, filed Sep. 11, 2000, the contents of which are incorporated herein by reference thereto.

The MoGen drive system is powered by a higher voltage (e.g. 36V nominal instead of the conventional 12V nominal system) battery pack. As shown in FIG. 2, the 36V bus is connected to a motor controller 56 that regulates the MoGen power. When the MoGen is in motor mode, the battery pack sees the motor controller as a load (drawing current out of the batteries). However, when the MoGen is in generator mode, the battery pack sees the motor controller as a charger. In addition to the motor controller, the 36V battery pack powers the DCDC converter. The DCDC converter transforms the 36V down to the conventional 12V for powering the standard automotive accessories (e.g. fans, radio, etc.).

The arrangement shown in FIG. 2 uses a non-isolated DCDC converter, thus the shunt is positioned on the high-side. The MoGen shaft is connected to the internal-combustion engine and the arrows indicate current flow.

The battery SOU or mode of operation of the MoGen system can dynamically change among four states:

1. Excess Regen;
 2. Zero Excess Regen;
 3. MoGen Neutral; and
 4. Motoring Discharge.

Excess Regen:

Of the Total Regen $i_{tr}$ provided by the MoGen, a portion powers the DCDC converter $i_{DCDC}$ and the remaining Regen (or the Excess Regen $i_{ER}$) recharges the battery pack. This is the state that the system will default to for a large majority of its operation time (e.g. cruising on highway).

If the battery pack SOC is low, the Excess Regen can be commanded up to a set value; if the battery pack SOC is high, the Excess Regen is tapereddown to a minimal value. The upper limit for Excess Regen is determined by the drivability of the vehicle: i.e. if the Excess Regen is too high, the powertrain will feel sluggish. This SOU is active:

a. Anytime the battery SOC is not full, and MoGen is being backdriven by the internal combustion engine or the transmission.

Zero Excess Regen:

The MoGen provides just enough Total Regen to power the DCDC converter ($i_{TR}=i_{DCDC}$). The Excess Regen to charge the battery pack is zero ($i_{ER}=0$). Zero Excess Regen is used when the batteries are fully charged. Determination of when the batteries are fully charged can be estimated from charge voltage, charge amperage, open-circuit voltage, and charge integration coupled with the Peukert relationship. In actuality, since the DCDC converter loads can be constantly fluctuating, the excess regen cannot be held to exactly zero. It is preferable to slightly overcharge than to consistently undercharge the battery pack. Thus, even when Zero Excess Regen is commanded, the system is biased toward slight Excess Regen. This SOU is active when:

a. The battery SOC is full.

b. After crank starting the ICE when the coolant temperature or the SOC is medium or high, the MoGen is controlled to Zero Excess Regen after the MoGen is done motoring the ICE, but before the combustion is deemed fully stabilized.

MoGen Neutral:

In this state the MoGen is free spinning, thus $i_M = i_{TR} = 0$. Since the accessory loads are still supported by the DCDC converter, $i_{DCDC}$ is still positive. The power for $i_{DCDC}$ is provided by $i_{DCDC+M}$, thus the battery pack is being discharged. This SOU is active when:

a. During some shift events. Neutral is commanded to eliminate aliasing, due to possible engine torque variability, of the transmission adaptives.

b. After crank starting the ICE when the coolant temperature or the SOC is low, the MoGen is controlled to Neutral after the MoGen is done motoring the ICE, but before the combustion is deemed fully stabilized to minimize engine load. c. Vehicle is keyed-on when the internal combustion engine is off.

Motoring Discharge:

The MoGen delivers mechanical work to the engine. The electrical charge flowing out of the battery pack $i_{DCDC+M}$ is the sum of this MoGen motoring load $i_M$ and the DCDC converter input load $i_{DCDC}$. This can occur under the following conditions:

a. During key-up crank start b. During a hybrid launch from a stop c. During a fuel-off downshift (U.S. patent application Ser. No. 09/551,460.

d. During an Inertia Eliminator routine.

In accordance with an exemplary embodiment of the present invention a control system is employed for the initial engine crank-starting upon key up.

Unique features of this system are:

1. The MoGen system can dynamically reapply electric motoring power during an engine start attempt, in addition to increasing IAC (idle-air-control) opening and slewing spark timing.

2. The MoGen system can modulate between four states (motoring, zero excess-regen, neutral, and regen) of MoGen power during a starting flare.

3. The Smart DCDC converter (U.S. patent application Ser. No. 09/659,395) does not allow battery B1's voltage to get under the minimum voltage required for the vehicle's computers.

4. The engine speed at which fuel and spark are delivered during a start is a function of battery state-of-charge and engine coolant temperature to improve tailpipe emissions, cranking smoothness, and to reduce excessive flare above the target idle speed.

Since the MoGen is constantly engaged to the internal combustion engine, via a belt or through direct mount to the transmission. There is difference from a conventional engine starting system in which the starter motor pinion gear is engaged to the engine ring gear by a solenoid. In a conventional system, once the engine is running by combustion, the starter motor pinion is disengaged, and cannot be smoothly re-engaged without the engine coming to rest.

To enable the starting system in accordance with an exemplary embodiment of the present invention, all of the following criteria must be met:

1. Key in the START position.
2. Engine speed =0.
3. Transmission in P (park) or N (neutral), or clutch disengaged for a manual transmission.
4. Engine, transmission, and MoGen controllers live.
5. Battery voltage balance among the modules (e.g. three for a 36V nominal system) must be within a certain range.
6. Anti-theft system has not been triggered.

Of course, the criteria for enclosed starting system may be varied to modify or include alternative criteria.

Figure 3:
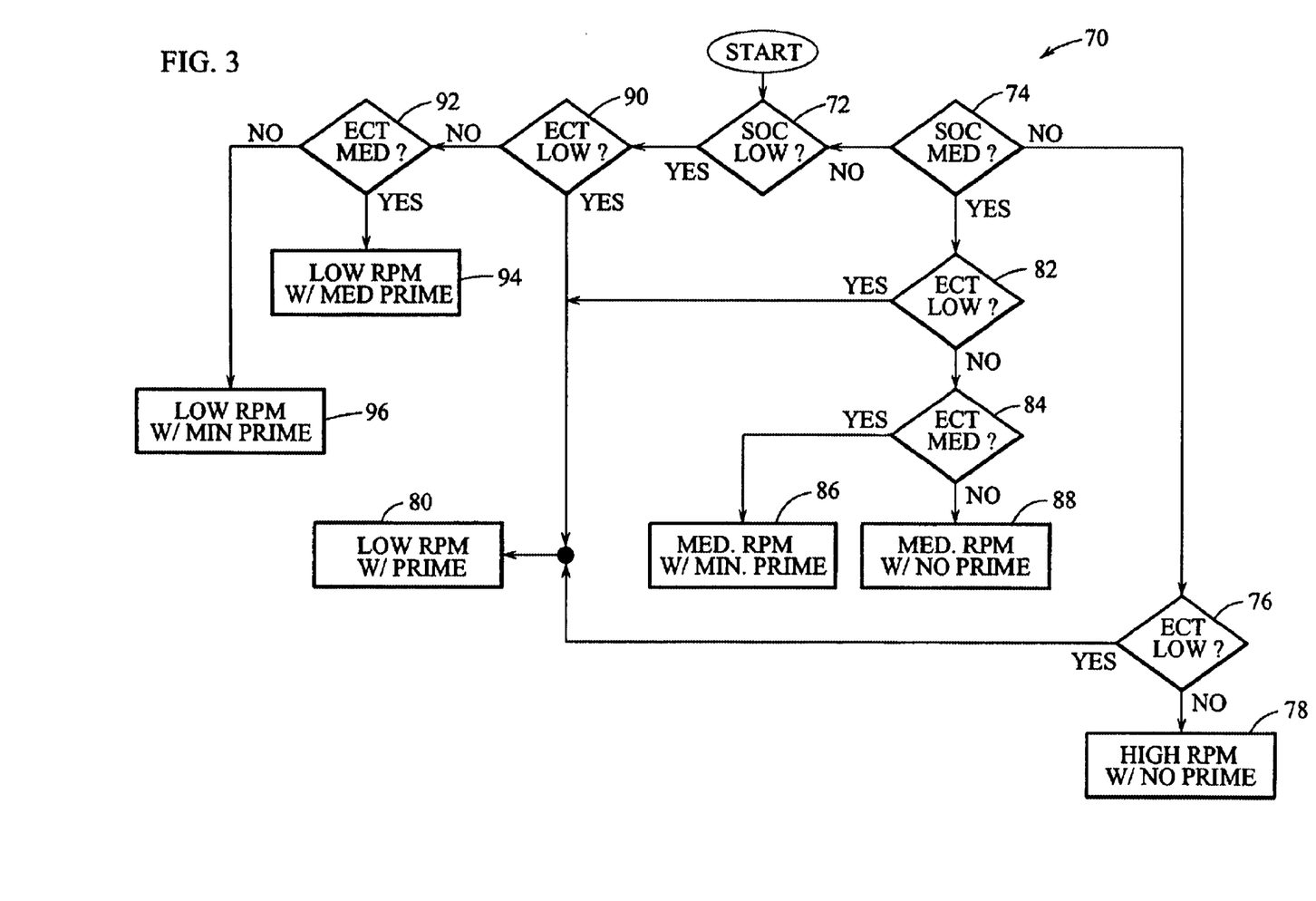
FIG. 3 is a flow chart illustrating portions of a control algorithm for determining fueling RPM and amount of prime pulse for a hybrid vehicle.

Referring now to FIG. 3, a flow chart depicting a control algorithm 70 for determining fueling RPM and amount of engine prime pulse for the MoGen system is illustrated. The engine speed at which the fuel (and amount of fuel) and spark are delivered for the engine start is a function of battery SOC and engine coolant temperature (ECT). For a number of SOC and ECT levels (e.g. low, med., high SOC), the engine speed for start is adjusted to improve cranking smoothness and tailpipe emissions.

During a starting sequence a first decision node 72 determines whether the batteries state of charge (SOC) is low (e.g. below a predetermined value), if the batteries state of charge is not low a decision node 74 determines whether the SOC is medium (e.g. below a predetermined value higher than the predetermined value of decision node 72).

If decision node 74 determines that the battery SOC is greater than the predetermined value of decision node 74 a decision node 76 determines whether the engine coolant temperature (ECT is below a predetermined calibration constant representing a low value). If decision node 76 determines that the engine coolant temperature is not below the predetermined value of decision node 76 the engine firing is initiated at a high RPM (e.g. 600 rpm) without a prime pulse. This firing is represented by box 78.

Alternatively, and if decision node 76 determines that the engine coolant temperature is below of the predetermined calibration constant of decision node 76 the engine firing is initiated at a low RPM (e.g. 100 rpm) with a prime pulse. This firing is represented by box 80.

Alternatively, and if decision node 74 determines that the battery state of charge is below the calibration constant of decision node 74, a decision node 82 determines whether the engine coolant temperature is low (e.g. below a calibration constant). If decision node 82 determines that the engine coolant temperature is below the calibration constant a decision node 82 the engine firing is initiated at a low RPM (e.g. 100 rpm) with a prime pulse. This firing is represented by box 80.

Alternatively, and if decision node 82 determines that the engine coolant temperature is above the calibration constant of decision node 82, a decision node 84 determines whether the engine coolant temperature is at a medium temperature (e.g. below a calibration constant representing medium temperature).

If decision node 84 determines that the engine coolant temperature is at the medium-range, the engine firing is initiated at a medium RPM (e.g. 400 rpm) with a minimum prime pulse. This firing is represented by box 86.

Alternatively, and if decision node determines that the engine coolant temperature is above to the medium-range, the engine firing is initiated at a medium RPM (e.g. 400 rpm) with a minimum prime pulse. This firing is represented by box 88.

If decision node 72 determines that the batteries state of charge is below the calibration constant of decision node 72 (e.g. low state of charge) a decision node 90 determines whether the engine coolant temperature is also low (e.g. below a calibration constant representing a low engine coolant temperature). If so, the engine firing is initiated at a low RPM (e.g. 100 rpm) with a prime pulse. This firing is represented by box 80.

Alternatively, and if decision node 90 determines that the engine coolant temperature is above the calibration constant of decision node 90, a decision node 92 determines whether the engine coolant temperature is in a medium range. If so, the engine firing is initiated at a low RPM (e.g. 100 rpm) with a medium prime pulse. This firing is represented by box 94.

Alternatively, and if decision node 92 determines that the engine coolant temperature is above the calibration constant of decision node 92 the engine firing is initiated at a low RPM (e.g. 100 rpm) with a minimal prime pulse. This firing is represented by box 96.

For example, if the SOC is high and the ECT is low, the engine firing initiates at a low engine speed (e.g. 100 rpm) with a prime pulse, but if the SOC is high and the ECT is medium, the engine firing can initiate at a higher engine speed without a prime pulse, thereby reducing tailpipe emissions.

Another example is if the SOC is low and the ECT is high, the firing can initiate at a low rpm with a minimal prime pulse.

It is, of course, contemplated that in accordance with an exemplary embodiment of the present invention the calibration constants and starting sequence parameters may vary, as application conditions require.

If the engine cranking speed is so low (e.g. if both the SOC and ECT are very low) that the ignition system is in an open-loop fixed-spark-timing routine (e.g. 10 deg. BTDC), the system will attempt to fire the engine at the lowest possible engine speed at which the combustion will not pulse the engine backwards. This ensures that the MoGen is motoring as effectively as possible.

Figure 4:
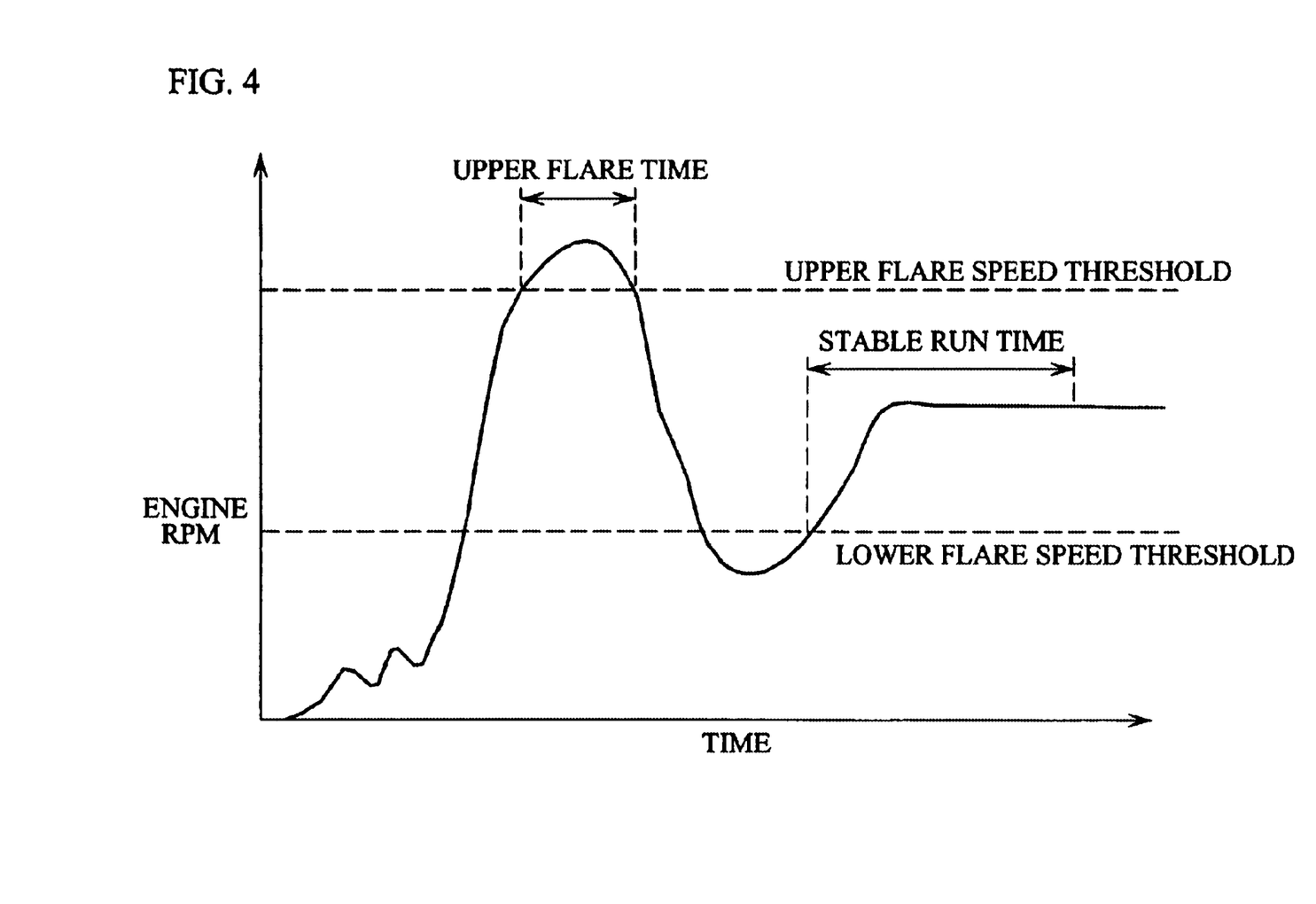
FIG. 4 is a graph illustrating engine speed profile during a starting sequence.

Referring now to FIG. 4, the MoGen motoring power is ramped down when the engine start is deemed successful. An engine start is successful if both of the following are satisfied:
1. The engine is firing above the Upper Flare Speed Threshold (FIG. 4) for greater than a set continuous time, Upper Flare Time.
2. The engine is firing above the Lower Flare Speed Threshold (FIG. 4) for greater than a set continuous time, Stable Run Time.

To determine if the engine has been properly started, the powertrain computer monitors the engine speed flare over time. If the engine speed surpasses the Upper Flare Threshold for a set time Upper Flare Time the MoGen motoring power is ramped down to zero excess regen. If the MoGen command were stewed to higher values of excess regen, the extra retarding torque imposed on the engine crank can drag down the engine speed.

The Upper Flare Speed Threshold and time calibration is set as a function of engine coolant temperature. When the engine is cold, the probability of unstable combustion is higher; therefore, the required engine speed threshold and time above that threshold before MoGen motoring power is reduced and is set higher than in a warm engine scenario.

If the battery SOC is deemed sufficiently high, and the engine speed declines after the initial flare is deemed too steep, the MoGen can first be set to neutral (negative excess regen since all the DCDC converter input power is drawn from the 36V battery bus). Setting the MoGen to neutral lets it spin freely, thus not actively contributing to the engine deceleration.

If before or after the MoGen is set to neutral (or zero excess regen), and the engine speed falls below the Lower Flare Speed Threshold, the MoGen motoring power is increased or reapplied to aid the combustion power to raise the engine speed back above the lower flare threshold. This is done in conjunction with increasing the IAC opening and optimizing spark timing for increased internal-combustion engine power (regardless of driver throttle command). The start is deemed successful if the engine speed stays above the Lower Flare Speed Threshold for a continuous time exceeding a preset value (Stable Run Time), which is a function of coolant temperature. If the engine speed droops below the Lower Flare Speed Threshold, the Stable Run Time value is reset.

Once the driver momentarily turns the ignition key to START or CRANK (i.e. the driver need not continuously hold the key in the start position), the hybrid powertrain control system takes over to smoothly and efficiently start the engine.

If the MoGen cannot prevent the engine from stalling, the next engine starting sequence must start from an ignition key position other than the "start" or "crank" position. For example, if the driver continuously holds the key in the start position (though the driver did not have to) during the unsuccessful start attempt, the key must be released back to the "run," "accessory," or "off" position for he starting system to make its next attempt.

The engine start is abandoned if any of the following are true:
1. Transmission taken out of P (park) or N (neutral).
2. The ignition key is removed, or turned to ACCESSORY, or OFF (i.e. not in RUN or START).
3. Maximum cranking time threshold is exceeded.

When the MoGen is spinning with the engine firing, the MoGen acts as a generator to power the DCDC converter and to charge the batteries. The "excess regen" is the MoGen generating power used to recharge the batteries. The DCDC converter converts the 36V nominal MoGen bus voltage down to the standard 12V nominal vehicle system voltage to power the ignition system, fuel pump, transmission solenoids, etc.

As discussed in the Battery Module Balancing application (U.S. patent application Ser. No. 09/659,395), the contents of which are incorporated herein by reference thereto, the DCDC converter output balances the battery state-of-charge (SOC) with the parallel-connected chassis-grounded battery (B1). An exception to the battery-balancing routine during engine cranking is that the DCDC converter strives to raise its voltage output to B1 so that its voltage stays above a set threshold (e.g. 9V). This is necessary in order to keep the powertrain computer, and thus the ignition system, active during the crank procedure.

Figure 5:
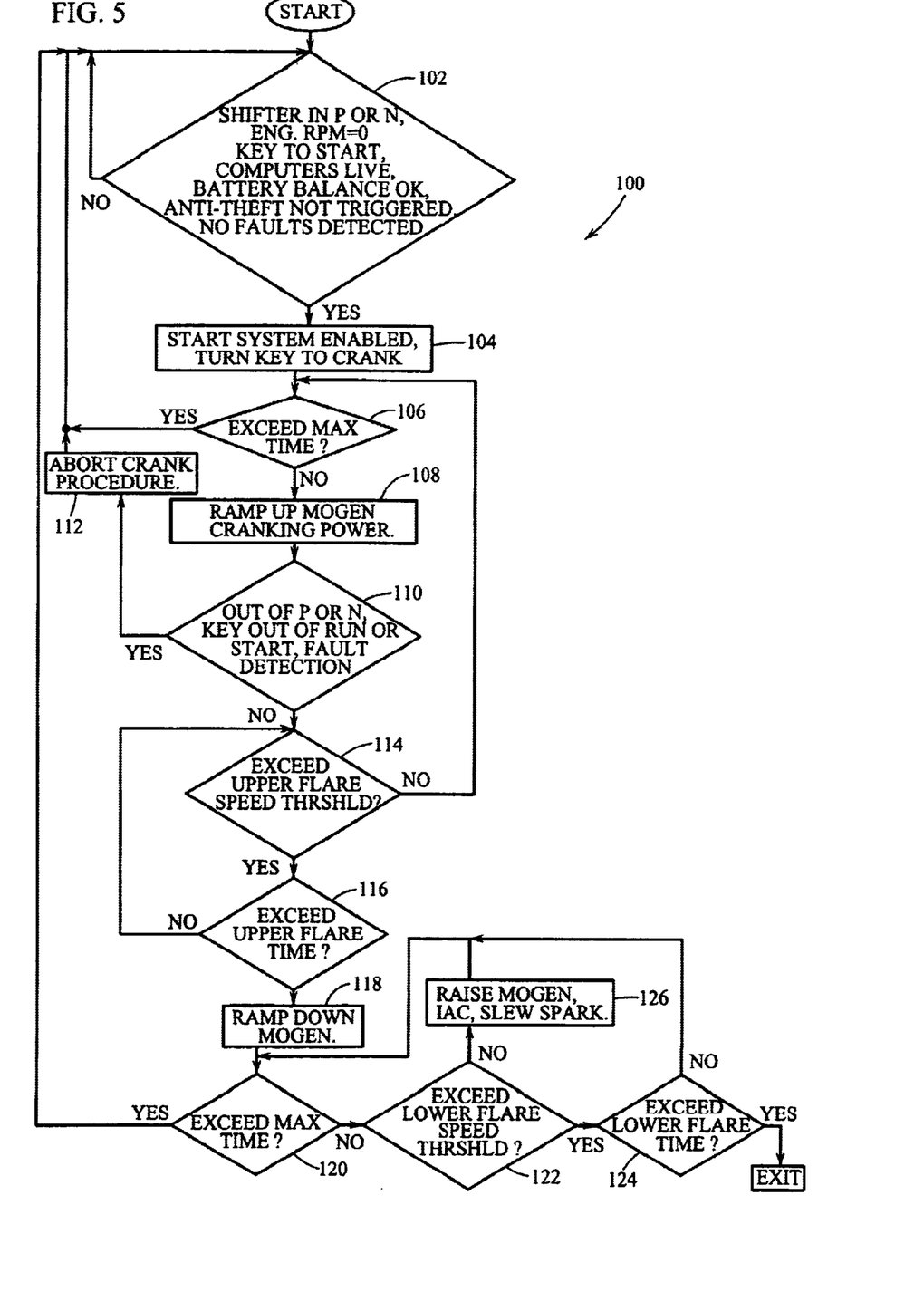
FIG. 5 is a flow chart illustrating portions of a control algorithm for an engine starting system.

Referring now to FIG. 5, a flow chart illustrates portions of a computer algorithm for a MoGen engine starting system 100, given a SOC and ECT. It is noted that system 100 runs simultaneously with control algorithm 70 during a starting event.

In accordance with an exemplary embodiment of the present invention, starting system 100 includes a decision node 102 that determines whether all of the conditions has been met for a starting of the hybrid vehicle to take place. As previously discussed, decision node 102 determines whether all of the following criteria have been met: Key in the START position; Engine speed=0; Transmission in P (park) or N (neutral), or clutch disengaged for a manual transmission; Engine, transmission, and MoGen controllers live; Battery voltage balance among the modules (e.g. three for a 36V nominal system) must be within a certain range; and Anti-theft system has not been triggered.

If all of the aforementioned criteria have been met a step 104 ensures that the start system has been enabled and the key has been turned to a crank position. A decision node 106 determines whether the maximum time has been exceeded, if so the system is returned to an initial state prior to decision node 106. Alternatively, and if the maximum time of decision node 106 has not been exceeded a step 108 instructs the power to the Mogen to be ramped up in order to provide cranking power to the system.

A decision node 110 determines if the anyone of the following is true: vehicle shifter out of park or neutral; ignition key position is out of a run or start position; an error (e.g. fault detection) has been detected; and in the case of a manual transmission the clutch pedal is no longer depressed or a clutch is no longer engaged, a step 112 instructs the system to abort the crank up procedure.

Alternatively, and if decision node 110 has found no conditions which would require aborting of the starting sequence, a decision node 114 determines whether the upper flare speed threshold (FIG. 4) has been exceeded. If the upper flare speed threshold has not been exceeded the system returns to the state indicated by decision node 106 otherwise, a decision node 116 determines whether the upper flare time has been exceeded.

If the upper flare time has not been exceeded the system returns to the state indicated by decision node 114 otherwise, a step 118 instructs the MoGen to ramp down.

After step 118 a decision node 120 determines whether the starting sequence as exceeded a maximum allowable time. If so, the system returns to the state indicated by decision node 102 otherwise, a decision node 122 determines whether the lower flare speed threshold (FIG. 4) has been exceeded. If so, a decision node 124 determines whether the lower flare time has been exceeded. If so, a starting sequence is exited.

Alternatively, and if decision node 122 determines that the lower flare speed threshold has not been exceeded, a step 126 raises the MoGen IAC, Slewand Spark. After step 126, the system returns to the state indicated by decision node 120.

Alternatively, and if decision node 124 determines that the lower flare time has not been exceeded the system returns to the state indicated by decision node 120.

Accordingly, and referring now to FIGS. 1–5 a starting system employing a Mogen control system in accordance with an exemplary embodiment of the present invention varies the electric motoring power during an engine start attempt wherein the MoGen system is capable of modulating between four states of MoGen power during a starting flare. In order to facilitate this process the control algorithms illustrated in FIGS. 3 and 5 are simultaneously utilized during a start event.

The algorithms monitor vehicle operating conditions through a plurality of sensors, such operating conditions include but not limited to the following: vehicle speed, engine speed, engine RPM, MoGen state of use, battery state of charge, engine cooling temperature in order to the vary the operating condition of the MoGen as well as the vehicle propulsion system during a starting event.

It is, of course, contemplated that in accordance with an exemplary embodiment of the present invention the above-mentioned predetermined values and starting sequence parameters of the above variable conditions may vary, as application conditions require.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for operating a propulsion system of a hybrid vehicle, comprising:

determining if an engine starting command has been requested;

sensing the state of charge of an electric storage medium;

sensing the temperature of an engine coolant of an internal combustion engine;

operating a motor/generator in a first mode of operation for providing a starting force to said internal combustion engine and in a second mode of operation for generating an electrical charge; and varying the rate of a prime pulse during a starting sequence of said internal combustion engine, said prime pulse being varied in response to the value of the state of charge of said electrical storage medium and the engine coolant temperature of said internal combustion engine.

2. The method as in claim 1, wherein said first mode of operation of said motor/generator is varied in response to the engine coolant temperature of said internal combustion engine.

3. The method as in claim 1, wherein said first mode of operation of said motor/generator is varied in response to the state of charge of said electric storage medium.

4. The method as in claim 3, wherein said first mode of operation of said motor/generator is varied in response to the engine coolant temperature of said internal combustion engine.

5. The method as in claim 4, further including:

varying the rate of a prime pulse and the starting force being applied to said internal combustion engine during a starting sequence of said internal combustion engine.

6. The method as in claim 5, wherein said internal combustion engine is started with a low RPM and a prime pulse when the state of charge is below a predetermined value indicating a low state of charge and the engine coolant temperature is below a predetermined value indicating a low engine coolant temperature.

7. The method as in claim 5, wherein said internal combustion engine is started with a low RPM and a medium prime pulse when the state of charge is below a predetermined value indicating a low state of charge and the engine coolant temperature is in a range defined by predetermined values indicating a medium engine coolant temperature.

8. The method as in claim 5, wherein said internal combustion engine is started with a low RPM and a minimal prime pulse when the state of charge is below a predetermined value indicating a low state of charge and the engine coolant temperature is above a predetermined value indicating a medium engine coolant temperature.

9. The method as in claim 5, wherein said internal combustion engine is started with a low RPM and a prime pulse when the state of charge is in a medium range defined by a pair of predetermined values indicating a medium state of charge and the engine coolant temperature is below a predetermined value indicating a low engine coolant temperature.

10. The method as in claim 5, wherein said internal combustion engine is started with a medium RPM and a minimal prime pulse when the state of charge is in a medium range defined by a pair of predetermined values indicating a medium state of charge and the engine coolant temperature is in a medium temperature range defined by a pair of predetermined values.

11. The method as in claim 5, wherein said internal combustion engine is started with a medium RPM when the state of charge is in a medium range defined by a pair of predetermined values indicating a medium state of charge and the engine coolant temperature is above a medium temperature range defined by a pair of predetermined values.

12. The method as in claim 5, wherein said internal combustion engine is started with a high RPM when the state of charge is above a medium range defined by a pair of predetermined values indicating a medium state of charge and the engine coolant temperature is above a low temperature defined by a predetermined value.

13. The method as in claim 5, wherein said internal combustion engine is started with a low RPM and a prime pulse when the state of charge is above a medium range defined by a pair of predetermined values indicating a medium state of charge and the engine coolant temperature is below a low temperature defined by a predetermined value.

14. A method for operating a propulsion system of a hybrid vehicle, comprising:
   determining if an engine starting command has been requested;
   sensing the state of charge of an electric storage medium;
   sensing the temperature of an engine coolant of an internal combustion engine;
   operating a motor/generator in a first mode of operation for providing a starting force to said internal combustion engine and in a second mode of operation for generating an electrical charge;
   varying the starting speed of said motor/generator in said first mode in response to the state of charge of said electric storage medium; and
   varying the rate of the prime pulse during a starting sequence of said internal combustion engine, said prime pulse being varied in response to the value of the state of charge of said electrical storage medium and the engine coolant temperature of said internal combustion engine.

15. The method for operating a propulsion system as in claim 14, wherein the step of determining if an engine starting command has been requested includes monitoring the position of a shifter of said vehicle, monitoring said internal combustion engine RPM, monitoring the position of an ignition key, monitoring the voltage of said electric storage medium.

16. The method for operating a propulsion system as in claim 14, wherein said starting force of said motor/generator in said first mode is varied in response to the speed of said internal combustion engine over time during a starting sequence.

* * * * *